United States Patent Office 3,548,608
Patented Dec. 22, 1970

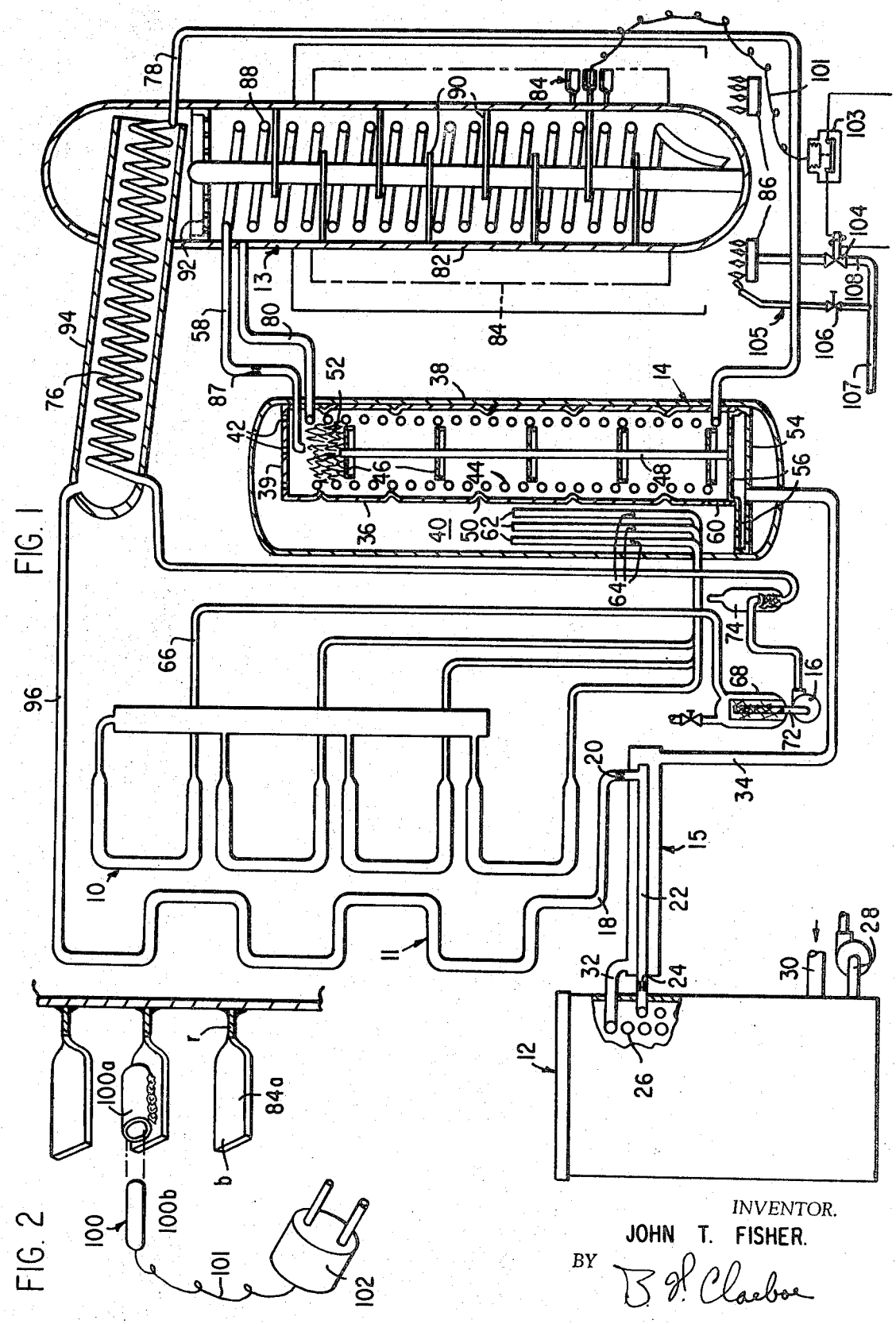
Dec. 22, 1970  J. T. FISHER  3,548,608
REFRIGERATION SYSTEM HAVING GENERATOR
TEMPERATURE SENSING MEANS
Filed July 30, 1968
INVENTOR.
JOHN T. FISHER.
BY
ATTORNEY.

3,548,608
REFRIGERATION SYSTEM HAVING GENERATOR TEMPERATURE SENSING MEANS
John T. Fisher, Indianapolis, Ind., assignor to Carrier Corporation, Syracuse, N.Y., a corporation of Delaware
Filed July 30, 1968, Ser. No. 748,873
Int. Cl. F25b 33/00
U.S. Cl. 62—148                 1 Claim

ABSTRACT OF THE DISCLOSURE

A refrigeration system comprised of a generator, solution-cooled exchanger, primary absorber, condenser, liquid-suction heat absorber, and chiller, wherein the generator is equipped with heat transfer surfaces, featuring in directly mounted relation thereon, temperature sensing means in control of the fuel combustion means effective with a remarkably high degree of accuracy to prevent development of excessive temperatures in the generator portion of the system thereby avoiding corrosion damage from the refrigerant to the generator and also to its associated heat transfer surfaces.

BACKGROUND OF THE INVENTION

It is known in the art to provide, in exposure to flue gases arising within a chamber surrounding the generator in a refrigeration system, thermocouple means or similar devices designed to control fuel input to the combustion means for the purpose of preventing overheating of the refrigerant whereby the possibility of generator corrosion and like deterioration of the heat transfer surfaces or fins thereon would result. However, the use of thermocouples in this environment suffers from at least one important disadvantage, which succinctly stated, is that the temperature of the flue gases is affected by fuel input and ambient conditions, with the result that a reliable indication of the generator shell temperature cannot be obtained. Also, thermocouples currently offered to the trade for accomplishing a temperature sensing function of the character indicated above, with the accuracy required, are not presently attractive from a cost standpoint. Further, thermocouples now available do not appear to have the requisite rapid response to variations in temperature conditions within a generator embodied in a refrigeration system of the general character contemplated herein.

SUMMARY OF THE INVENTION

The present invention is particularly directed to a refrigeration system incorporating a generator of shell construction having securely attached thereto, and preferably to at least one of its heat transfer surfaces or fins not far removed from the lower end of the generator, means for sensing the shell temperature and thereby conditions interiorly of the generator so as to rapidly detect any overheating of the ammonia refrigerant. The temperature sensing means preferably takes the form of a probe welded or otherwise secured to a lower fin or heat transfer surface so contoured as to meet particular needs, and electrically connected to switch means in direct control of the valve which regulates fuel input to the combustion means. In this novel manner, overheating of the refrigerant is effectively avoided and consequent corrosion of the generator shell and heat transfer surfaces thereon are eliminated.

BRIEF DESCRIPTION OF THE DRAWING

FIG. 1 illustrates schematically, with portions thereof taken in section, a preferred form of air conditioning system incorporating the present invention; and FIG. 2 is a view broken away to more fully illustrate an exemplary sensing arrangement.

DESCRIPTION OF THE PREFERRED EMBODIMENT

Referring now to the drawing, there is shown in FIG. 1 a refrigeration system comprising a primary absorber 10, a condenser 11, an evaporator or chiller 12, a generator 13 to which the present invention is directed, a solution-cooled exchanger 14, and a liquid-suction heat exchanger 15 connected to provide a refrigeration cycle. Pump means 16 are employed to circulate weak absorbent solution from the primary absorber 10 to the generator 13. As used herein, the term "weak absorbent solution" refers to a solution which is relatively low in absorbent power, and the expression "strong absorbent solution" designates a solution which is high in absorptive capacity. A suitable absorbent for use in the system described is water, and a desirable refrigerant is ammonia.

Liquid refrigerant condensed in the condenser 11 passes through refrigerant liquid passage 18, and refrigerant restriction 20 to heat exchange tube 22 of the liquid-suction heat exchanger 15. The liquid refrigerant is cooled in the tube 22 and emerges from the liquid-suction heat exchanger and passes through refrigerant restriction 24 into heat exchanger 26 in the chiller 12.

A fluid medium such as water to be chilled passes over the exterior of the heat exchanger 26 where it is chilled by giving up heat to evaporate refrigerant within the heat exchanger. The chilled medium passes out of the chiller 12 through line 28 to suitable remotely located heat exchangers (not shown), after which it is returned to the chiller through inlet 30 for rechilling.

The cold refrigerant evaporated in the heat exchanger 26 passes through refrigerant vapor passage 32 and through the liquid-suction heat exchanger 15 in heat exchange relation with liquid refrigerant passing through the tube 22. The refrigerant vapor then passes through refrigerant vapor passage 34 into the solution-cooled absorber 14.

The solution-cooled absorber 14 is formed within a substantially tubular or cylindrical vessel 38 exemplified by a tubular and preferably generally cylindrical internal baffle 36 which divides the vessel 38 into the solution-cooled absorber 14 and a second solution chamber 40. The vessel 38 is preferably closed at opposite ends. The baffle 36 may be provided with a cover plate 39 having a plurality of vapor discharge apertures 42 therein which allow vapor to escape from the solution-cooled absorber 14 into the chamber 40.

A weak solution heat exchanger 44, preferably comprising a helical coil, is disposed within the solution-cooled absorber 14. A plurality of horizontally extending plates 46 are suitably secured to a central support member 48 and arranged interiorly of the baffle 36 to cooperate with annular grooves 50 and the heat exchanger 44 to provide a tortuous continual flow or passage for vapor and solution through the solution-cooled absorber 14. Suitable packing means, such as Raschig rings 52, may fill the space between the uppermost plate 46 and the top of solution-cooled absorber to reduce the tendency for solution froth to escape through the discharge apertures 42.

A refrigerant vapor distributor header 54 is secured to close the bottom of the baffle 36. The header 54 is provided with refrigerant vapor ports 56 for passage of refrigerant vapor from the line 34 into the solution-cooled absorber 14 and the chamber 40. Strong solution from the generator 13 is admitted to the top portion of the solution-cooled absorber 14 through line 58. The strong solution moves downwardly through the solution-cooled absorber in counter-flow relation with upwardly passing refrigerant vapor and weak solution passing through the coil 44. A strong solution discharged passage 60 is provided adjacent the lower portion of the baffle 36 for movement of solution from the solution-cooled absorber into the chamber 40.

Solution discharge passages 62 are provided for passing a mixture of refrigerant vapor and solution from the chamber 40 to the primary absorber 10. Each of the discharge passages may take the form of a tubular member having open upper ends for admission of vapor and a solution inlet aperture 64 disposed below the level of absorbent solution in the chamber 40. This construction insures a mixed flow of liquid and vapor to the primary absorber.

A cooling medium, preferably ambient air, is passed through the primary absorber 10 in heat exchange relationship with the absorbent solution to cool the same and promote the absorption of the refrigerant vapor in the absorber. The same cooling medium may be supplied to the condenser 11 in heat exchange relationship with refrigerant therein to condense the refrigerant.

Cold weak absorbent solution passes from the primary absorber 10 through line 66 into pump inlet tank 68. Weak solution from the inlet tank 68 is supplied to the weak solution pump 16 through line 72. Liquid from the pump 16 passes through pump discharge tank 74 to a rectifier heat exchange coil 76. From the coil 76 the weak solution moves through line 78 to the weak solution heat exchanger 44 in the solution cooled absorber 14. The weak solution from the coil 44 passes through line 80 into the upper portion of the generator 13 together with any vapor formed in the coil 44.

The generator 13 comprises a shell 82 having fins 84 suitably affixed thereto, as by welding. An exemplary arrangement of fins or heat transfer surfaces will be later described. The generator is heated by a gas burner 86 or any other desired heating means. The weak solution is boiled in the generator 13 to form a strong solution and refrigerant vapor.

The hot strong absorbent solution passes upwardly through the analyzer section of the generator 13 through analyzer coil 88 in heat exchange relationship with the weak solution passing downwardly over the coil. The warm strong solution then moves through the line 58, which has a solution restrictor 87 therein, and is then discharge into the upper portion of the solution-cooled absorber 14.

Refrigerant vapor formed in the generator 13 passes upwardly through the analyzer section thereof where it is concentrated by mass transfer with weak solution passing downwardly over the analyzer coil 88. Analyzer plates 90 within the generator 13 provide a tortuous path for flow of solution and vapor to assure intimate contact therebetween and to thus improve the mass transfer. The refrigerant vapor from the analyzer section passes through reflux plate 92 in heat exchange relationship with absorbent condensed in rectifier 94. The vapor is then directed through the rectifier 94 in heat exchange relationship with the rectifier heat exchange coil 76. Absorbent condensed in the rectifier 94 flows downwardly onto the plate 92 where it is heated by the refrigerant vapor passing therethrough. The heated absorbent is then passed to the generator along with the weak solution discharged into the generator from line 80. Vapor is directed through line 96 to the condenser 11 to complete the refrigeration cycle.

In a refrigeration system of the general character hereinabove described, it has been found that corrosion of the generator shell, and possibly the heat transfer means thereon, can occur when the refrigerant within the generator becomes overheated. Excessive temperatures of the ammonia if they take place with frequency or are of long duration, can well lead to destruction of the generator, particularly in the upper and relatively hotter region thereof.

As earlier noted, the prior art has endeavored to detect the temperature of the flue gases by use of strategically located thermocouples. However, devices of this character as now available have reliability and cost disadvantages, and more specifically, are incapable of rapidly and accurately detecting or signaling temperature variations within the generator shell.

The inadequacies of the earlier approaches to this problem are overcome by a structural arrangement exemplified by that shown in the drawing. The fin arrangement designated in its entirety in FIG. 1 by the numeral 84 preferably comprises a plurality of axially spaced fin elements 84a encompassing the generator shell, which desirably are of stepped or tapered configuration. The fin elements along a controlled axial length of the generator are affixed to the shell by continuous welding techniques; and each fin element is suitably shaped to include a root portion $r$ and integral body portion $b$. One or more of the fin elements 84a along the lower portion of the generator shell, which portion for purposes of example does not include more than a section one-third axially distant from the extreme bottom of the shell, has attached thereto tubular portion 100a of temperature sensing means generally indicated by the numeral 100. Designed for slidable association with the tubular portion 100a, in tight fitting relation therewith, is a probe or male member 100b.

The probe is electrically connected by lead means 101 to a plug member 102 adapted to be received in mating contact with a bellows actuated temperature sensitive device or switch means 103, or means equivalent thereto, controlling a valve 104 of the solenoid responsive type regulating the input of gas or other combustion media to the burners 86. Pilot gas means 105, the flow thereto of which is under control of hand manipulatable valve means 106, is fed from main line 107 also serving conduit 108 leading through valve means to the combustion means 86, taking in a preferred embodiment of the invention a generally annular configuration.

It is now manifest from the description hereinabove set forth, particularly when reference is made to the accompanying drawing, that a novel refrigeration system has been provided. The temperature sensing means 100, by virtue of direct intimate attachment to a fin element 84a, or certain applications dictate, to the shell of the generator 82 itself, accurately and rapidly detects through elements 100a and 100b the input of excessive amounts of fuel such that the flue gases in the upper portion of the generator reach abnormally high temperatures and corrosion of the generator shell and even the heat transfer surfaces or fins thereon is likely to result. To be more specific, when a secure joint between the tubular member 100a and one or more lower fin elements 84a is achieved, the probe inserted in the tubular member or sleeve 100a, and by means of the electrical connection through the lead 101 and plug 102 to the switch means 103, it is assured that fuel input through the valve means 104 from the main line 107 will be accurately controlled and the extent of flame emitted by the burner 86 will be rapidly increased or diminished as operating conditions interiorly of the generator shell warrant.

Problems coincident to the use of thermocouples and other prior art devices are effectively eliminated by this invention and there is provided herein a temperature sensing system characterized by rapidity of response to variations in fuel gas temperatures, simplicity of installation, reliability of operation, and ease of control.

Variations and modifications of the invention have been discussed herein, and these and other changes can of course be practiced without departing from the spirit of the invention or the scope of the subjoined claim.

I claim:

1. In a refrigeration system having a generator, an absorber, a condenser, an evaporator, and combustion means for heating said generator, the improvement which comprises a plurality of radially extending and axially spaced fin elements integral with said generator providing heat transfer surfaces thereon, temperature sensing means comprising a tubular member affixed to at least one of said fin elements, said tubular member receiving therein a probe member, said probe member having electrically attached thereto plug means, said plug means being electrically connected to switch means, said switch means controlling the input of fuel to said combustion means in direct response to the action of said probe member thereby regulating the temperature interiorly of said generator to avoid overheating said generator when refrigerant is contained therein and reduce the possibility of corrosion of the generator structure.

References Cited

UNITED STATES PATENTS

| | | | |
|---|---|---|---|
| 2,138,941 | 12/1938 | Roudanez | 236—14 |
| 2,221,750 | 11/1940 | Ashby et al. | 62—148X |
| 2,257,735 | 10/1941 | Kleen | 62—148X |
| 2,298,924 | 10/1942 | Bichowsky | 62—148 |
| 2,401,233 | 5/1946 | Kleen | 62—148X |
| 3,367,137 | 2/1968 | Whitlow | 62—148X |

WILLIAM E. WAYNER, Primary Examiner

U.S. Cl. X.R.

62—497; 122—479

UNITED STATES PATENT OFFICE
CERTIFICATE OF CORRECTION

Patent No. 3,548,608                    Dated December 22, 1970

Inventor(s) JOHN T. FISHER

It is certified that error appears in the above-identified patent and that said Letters Patent are hereby corrected as shown below:

Column 1, line 2, "exchanger" should read --absorber--

Column 1, line 3, "absorber" should read --exchanger--

Column 3, line 4, "discharged" should read --discharge--

Column 3, line 46, "discharge" should read --discharged--

Signed and sealed this 28th day of March 1972.

(SEAL)
Attest:

EDWARD M. FLETCHER, JR.           ROBERT GOTTSCHALK
Attesting Officer                 Commissioner of Patents